March 10, 1959

W. J. EAST ET AL 2,877,419

PYROTECHNIC CIRCUIT TESTER

Filed July 30, 1958

INVENTORS
WILLIAM J. EAST
HARRY M. LANDERS

March 10, 1959

W. J. EAST ET AL 2,877,419

PYROTECHNIC CIRCUIT TESTER

Filed July 30, 1958

INVENTORS
WILLIAM J. EAST
HARRY M. LANDERS

BY W.E. Thibodeau, A.J. Dupont
& J. P. Edgerton

United States Patent Office 2,877,419
Patented Mar. 10, 1959

2,877,419

PYROTECHNIC CIRCUIT TESTER

William J. East and Harry M. Landers, Washington, D. C.

Application July 30, 1958, Serial No. 752,146

3 Claims. (Cl. 324—133)

(Granted under Title 35, U. S. Code (1952), sec. 266)

The invention described herein may be manufactured and used by or for the Government for governmental purposes without the payment to us of any royalty thereon.

This invention relates generally to improved means for detecting and permanently recording the presence of electrical energy in a socket, plug or jack which would be of sufficient magnitude to cause premature detonation of an explosive cartridge to be connected therein.

Explosive cartridges, such as squibs, have long been used in ordnance devices for the purpose of initiating explosive operations such as the detonation of a missile. Sometimes, however, premature explosion occurs because the plug, socket or jack into which the explosive cartridges are to be connected have accidentally obtained sufficient energy to cause explosion of the explosive cartridge as soon as it is connected. These premature explosions can produce disastrous results such as where missiles and rockets are being connected to a plane prior to take-off. It is of considerable importance therefore to be able to conveniently determine when the explosive cartridge can be safely placed in its socket. This invention provides improved means for making this determination.

In a typical embodiment of the invention, a one-hand operated pyrotechnic tester incorporates test cartridges which are semi-automatically fed into a position where they can be electrically connected in the socket to be tested. Each test cartridge has the same characteristics as the explosive cartridge which is to be connected in the socket and is adapted to change color after igniting. If the test cartridge does not explode as indicated by no change in color, the actual cartridge can safely be connected. The tester additionally incorporates internal means for checking each test cartridge which fails to ignite.

Broadly it is an object of this invention to provide a pyrotechnic circuit tester which will detect and permanently record the presence of electrical energy at sockets, plugs or jacks which would be sufficient to cause premature ignition of an explosive cartridge to be connected therein.

Another object is to provide a circuit tester which semi-automatically feeds individual pyrotechnic test cartridges into a position where they can receive electrical energy from sockets, plugs or jacks, and which test cartridges will permanently change color if the energy they receive would be sufficient to cause firing of the explosive cartridge to be connected therein.

Another object of this invention is to provide additional means in the pyrotechnic circuit tester which can effect an instantaneous check upon the igniting capabilities of each pyrotechnic test cartridge which does not change color.

Still another object is to provide a circuit tester as described above which can be used with only one hand and which is reliable, sturdy and inexpensive to manufacture.

The specific nature of the invention, as well as other objects, uses and advantages thereof, will clearly appear from the following description and from the accompanying drawing, in which.

Figure 1:
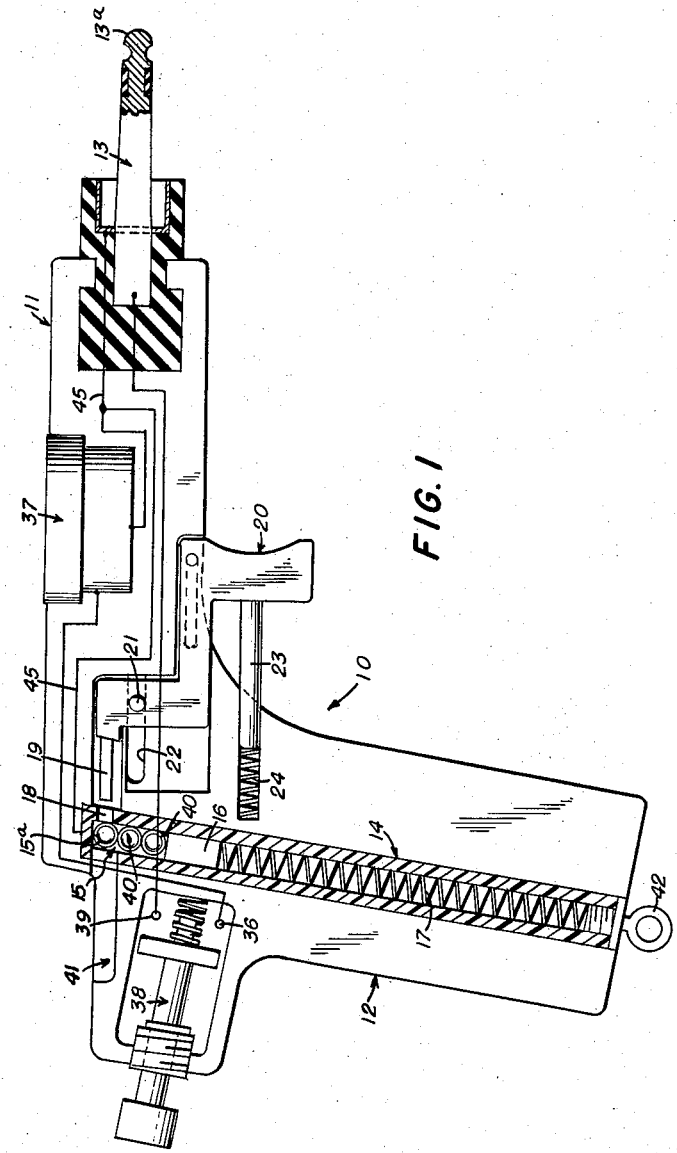
Figure 1 is a sectional side view of the pyrotechnic circuit tester in accordance with this invention.
Figure 2:
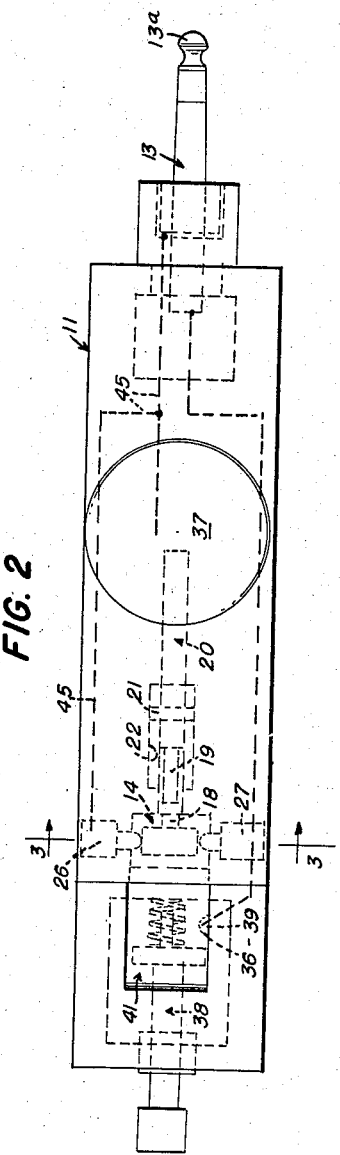
Figure 2 is a plan view of the tester shown in Figure 1.

Referring now to Figures 1 and 2, there is shown the pistol-shaped tester 10 of this invention. Because of the pistol shape, the tester 10 is capable of being held and manipulated by one hand. The body of the tester 10 is made of a suitable plastic, such as an epoxy resin, and comprises a barrel 11 and handle 12 which is connected to barrel 11. Probe 13 is attached to, and extends beyond, the muzzle end of barrel 11. The probe 13a of probe 13 is designed to fit into the particular socket, jack or plug to be tested. Probe 13 is of conventional construction and obviously other types of probes may also be used which are adapted for the particular socket to be tested. Handle 12 houses a rectangular clip 14 having a series of pyrotechnic test cartridges 40. Clip 14 is composed of any suitable insulating material such as an epoxy resin or other suitable plastic.

Figure 3:
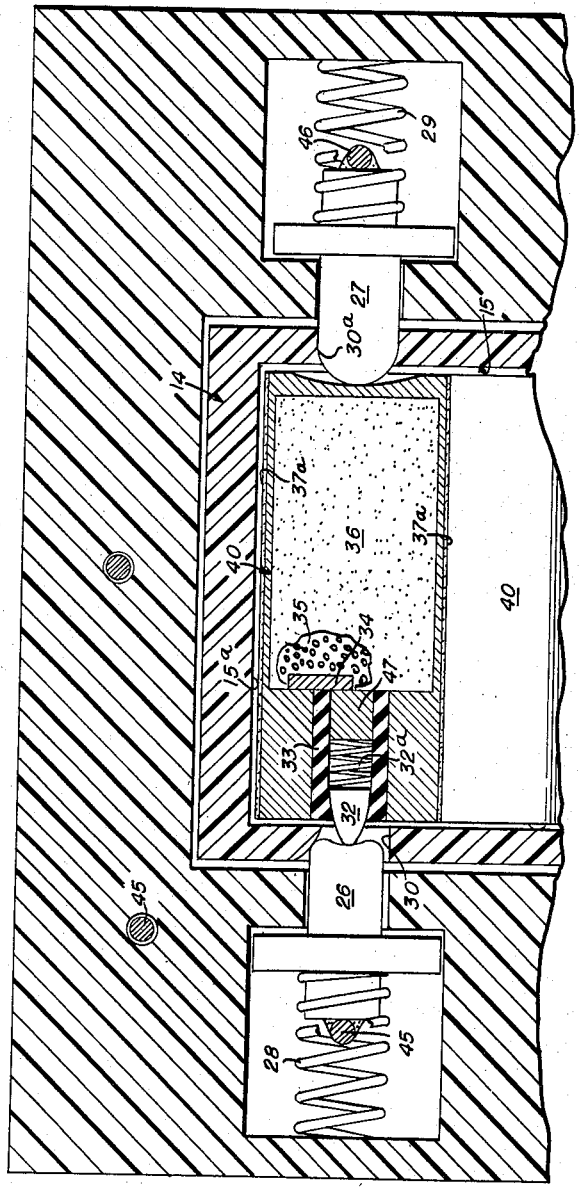
Figure 3 is a sectional view taken through lines 3—3 of Figure 2 showing a portion of the tester which receives a pyrotechnic cartridge.

Figure 3 shows in detail a portion of the tester 10. Groove 15 is cut from the end of clip 14 which extends into barrel 11 and is substantially rectangularly shaped so that the longitudinal axis of the groove intersects perpendicularly the longitudinal axis of clip 14. The depth of groove 15 is slightly larger than the diameter of cartridges 40. Groove 15 receives test cartridges 40 which are fed by the plastic slide 16 in clip 14. Spring 17 (Figure 1) presses slide 16 so that slide 16 can feed pyrotechnic test cartridges 40 into groove 15. The maximum upward position of the slide 16 in clip 14 can be limited by any suitable means such as a stop member protruding into the cavity of clip 14.

Figures 1 and 2 show a slot 18 which is cut through the groove 15 so that the end of rod 19 can pass and enter groove 15. Rod 19 is connected to trigger 20 which is slidable relative to the holder 10 in a direction substantially perpendicular to the longitudinal axis of clip 14. Movement of trigger 20 is controlled by pins 21 sliding in slots 22, and by rod 23 sliding in bore 24. Spring 25 in bore 24 forces trigger 20 away from the handle 12, and when the trigger is not depressed prevents rod 19 from remaining in groove 15 as shown in Figures 1 and 2. Steel pins 26 and 27, as shown in Figure 3, are substantially coaxial to the longitudinal axis of groove 15 and are resiliently urged towards each other by springs 28, 29. Pins 26, 27, extend into slots 30, 30a which are cut in the ends of clip 14, and the ends of pins 26, 27 which extend into groove 15 are designed to contact and hold individual cylindrical pyrotechnic test cartridges 40. Pins 26, 27 also serve to retain the clip 14 in the handle 12 by bearing against the surface of slots 30, 30a.

The pyrotechnic cartridge 40 is held in groove 15 by the combined pressure of the slide 16 pressing the cartridge 40 against the side surface 15a of groove 15 and the pressure exerted on the ends of the cartridge by pins 26, 27. Cartridge 40 is of conventional construction and comprises a metal cylinder 31 which encloses a quantity of heat powder 36. Heat powder 36 can be any suitable composition which is capable of creating large amounts of heat when ignited—for example, a mixture of lead, selenium, aluminum and magnesium.

At one end of cartridge 40 is metal pin 32 insulated from cylinder 31 by insulating sleeve 33, which is composed of rubber or plastic. Pin 32 is urged outwardly of catridge 40 by metal spring 32a which is connected at one end to pin 32 and at the other end to metal rod 47. Rod 47 is held in position by sleeve 33. Complete outward movement of pin 32 is prevented by the taper of sleeve 33. Other means such as stop pins may also be used for this purpose. Spring 32a transmits electrical energy received by pin 32 to rod 47. Rod 47 is electrically connected to cylinder 31 by wire 34. Surrounding wire 34 is an easily ignitable powdered material 35, such as lead styphnate. Powder 35 is ignited by heat generated by electrical energy passing through wire 34. Wire 34 receives this energy from pin 26 which in turn receives electrical energy from probe 13 by means of insulated wire 45. Wire 46 (Figure 2) is connected at one end by soldering, for example, to one end of pin 27 and at the other end to ground contact 39 on switch 38.

When the electrical energy through wire 34 is large enough, powder 35 will be ignited, igniting powder 36 causing cylinder 31 to become very hot. Heating of cylinder 31 completely burns off paint 37a from the surface of cylinder 31 which is chosen to be of a color different from paint 37a. The resulting change in color thereby provides a permanent record that the electrical energy at the plug, socket or jack in which the probe 13 has been inserted would be sufficient to cause ignition if an explosive cartridge were inserted.

Ordinarily, if the socket is safe there will be no energy at the plug, socket or jack and therefore the cartridge 40 will not change color. However, there is also the possibility that there is energy available to prematurely fire an explosive cartridge, but that the particular pyrotechnic cartidge being used to detect the presence of this energy is defective.

In order to overcome this possibility, battery 37 (Figures 1 and 2) is electrically connected by means of switch 38 to pin 26. Switch 38 is normally open. The energy supplied by the battery 37 is adapted to be substantially the same as that required to reliably ignite a pyrotechnic test cartridge 40. By passing switch 38, the operator electrically connects normally open contacts 36, 39 causing battery 37 to send sufficient energy to ignite cartridge 40. If the cartridge initially did not change color and now changes color, then the operator knows that the cartridge was initially good, and that the energy at the jack or socket is not sufficient to cause premature firing.

If the cartridge did not change color initially, and upon checking by use of battery 37 the cartridge still does not change color, then the cartridge is defective and should be discarded by the operator and the socket re-tested with a new cartridge.

The tested cartridges can be expelled from goove 15 by the operator pressing trigger 20 with his finger. Trigger 20 when pressed towards the handle 12 forces the end of rod 19 through slot 18 so that the rod 19 can push cartridge 40 out of groove 15 and into recess 41 from whence it can fall from holder 10. Spring 25 automatically returns the trigger 20 to the position shown in Figures 1 and 2 where the rod 19 is out of groove 15, thereby permitting slide 16 to press another pyrotechnic test cartridge 40 into groove 15. The above-described operation effects semi-automatic loading of the pyrotechnic test cartridges 40.

When the supply of pyrotechnic cartridges has become exhausted in clip 14, the operator can grasp ring 42 and pull it and attached clip 14 from handle 12 so that the clip 14 can be refilled with other cartridges.

It will be apparent to those skilled in the art that the electrical characteristics of the explosive cartridge which to be placed in the socket, jack or plug determines the characteristics which the pyrotechnic test cartridge 40 should have. The characteristics of the pyrotechnic test cartridges can be varied by varying the resistance of wire 34, or by varying the type of powder 35 which is used to ignite the main heat powder charge 36. Powders having different igniting levels require more or less heat from wire 34 before they ignite.

It should be evident that the pyrotechnic circuit tester according to this invention may also be used to detect and record the presence of any predetermined minimum amount of electrical energy present at any socket merely by providing a test cartridge 40 which has appropriate characteristics.

It will be apparent that the embodiments shown are only exemplary and that various modifications can be made in construction and arrangement within the scope of the invention as defined in the appended claims.

We claim as our invention:

1. A device for detecting and permanently recording the presence of electrical energy having a predetermined minimum magnitude, said device comprising in combination: a plastic holder, said holder comprising a barrel and handle attached to said barrel; an electrical probe attached to, and extending from, one end of said barrel; pyrotechnic cartridge feeding means having a plurality of pyrotechnic cartridges stored therein, said feeding means being housed in said handle and extending into said barrel, the end of said feeding means in said barrel having a substantially rectangular groove therethrough, said groove being perpendicular to the longitudinal axis of said feeding means so that said feeding means can feed cartridges directly into said groove, said groove being designed to receive only individual cartridges; first and second pins protruding into opposite ends of said groove with their longitudinal axes substantially parallel to the longitudinal axis of said groove, said first and second pins being resiliently urged into said groove in order to contact and hold the ends of individual cartridges fed into said groove by said feeding means, the first of said pins being connected electrically to said probe so that said first pin can transmit electrical energy received by said probe to individual cartridges held in said groove, each cartridge being designed to ignite and change color upon receiving electrical energy greater than some predetermined minimum magnitude.

2. A device for detecting and permanently recording the presence of electrical energy having a predetermined minimum magnitude, said device comprising in combination: a plastic holder comprising a barrel and a handle attached to said barrel; an electrical probe attached to, and extending from, one end of said barrel; pyrotechnic cartridge feeding means having a plurality of pyrotechnic cartridges stored therein, said feeding means being housed in said handle and extending into said barrel, the end of said feeding means in said barrel having a substantially rectangular groove therethrough, said groove being perpendicular to the longitudinal axis of said feeding means so that said feeding means can feed cartridges directly into said groove, said groove being designed to receive only individual cartridges; cartridge removing means adapted to remove individual cartridges from said groove; first and second pins protruding into opposite ends of said groove with their longitudinal axes substantially parallel and coaxial to the longitudinal axis of said groove, said first and second pins being resiliently urged into said groove in order to contact and hold the ends of individual cartridges fed into said groove by said feeding means, the first of said pins being connected electrically to said probe so that said first pin can transmit electrical energy received by said probe to individual cartridges held in said groove, each cartridge being designed to ignite and change color upon receiving an electrical energy greater than some predetermined minimum magnitude.

3. A device for detecting and permanently recording the presence of electrical energy having a predetermined minimum magnitude, said device comprising in combination: a pistol-shaped plastic holder, said holder comprising a barrel and handle attached thereto; an electrical probe attached to, and extending from, one end of said barrel; pyrotechnic cartridge feeding means having a plurality of pyrotechnic cartridges stored therein, said feeding means being housed in said handle and extending into the other end of said barrel, the end of said feeding means extending into said barrel having a substantially rectangular groove therethrough in a direction perpendicular to the longitudinal axis of said feeding means so that said feeding means can feed cartridges directly into said groove, said groove being designed to receive only individual cartridges; first and second pins protruding into said groove with their axes substantially parallel and coaxial to the longitudinal axis of said groove, said first and second pins being resiliently urged into said groove so as to contact and hold the ends of individual cartridges fed into said groove, the first of said pins being connected electrically to said probe so that said first pin can transmit electrical energy received by said probe to the cartridge held in said groove, each cartridge being designed to ignite and change color upon receiving an electrical energy greater than some predetermined minimum magnitude; a battery in said barrel positioned between said feeding means and said probe, the energy supplied by said battery being substantially the same as required to reliably ignite one of said pyrotechnic cartridges; a switch housed in said holder, said switch when closed electrically connecting said battery to the cartridge in said groove, thereby providing a positive check upon each cartridge.

No references cited.